Nov. 25, 1958 N. E. NILSSON ET AL 2,862,058

SELECTOR SYSTEMS

Filed May 2, 1955 2 Sheets-Sheet 1

INVENTORS
NILS EMIL NILSSON
GUSTAV OSKAR RODNERT
JOHN CARL HAROLD BJÖRK
BY [signature]
ATTORNEY Nov. 25, 1958 N. E. NILSSON ET AL 2,862,058

SELECTOR SYSTEMS

Filed May 2, 1955 2 Sheets-Sheet 2

INVENTORS
NILS EMIL NILSSON
GUSTAV OSKAR RODNERT
JOHN CARL HAROLD BJÖRK
BY [signature]
ATTORNEY United States Patent Office 2,862,058

Patented Nov. 25, 1958

2,862,058

SELECTOR SYSTEMS

Nils Emil Nilsson, Essingen, Gustav Oskar Rodnert, Hagersten, and John Carl Harold Björk, Stockholm, Sweden, assignors to Telefonaktiebolaget L M Ericsson, Stockholm, Sweden, a company of Sweden Application May 2, 1955, Serial No. 505,491

Claims priority, application Sweden May 18, 1954

1 Claim. (Cl. 179—17)

Figure 1:
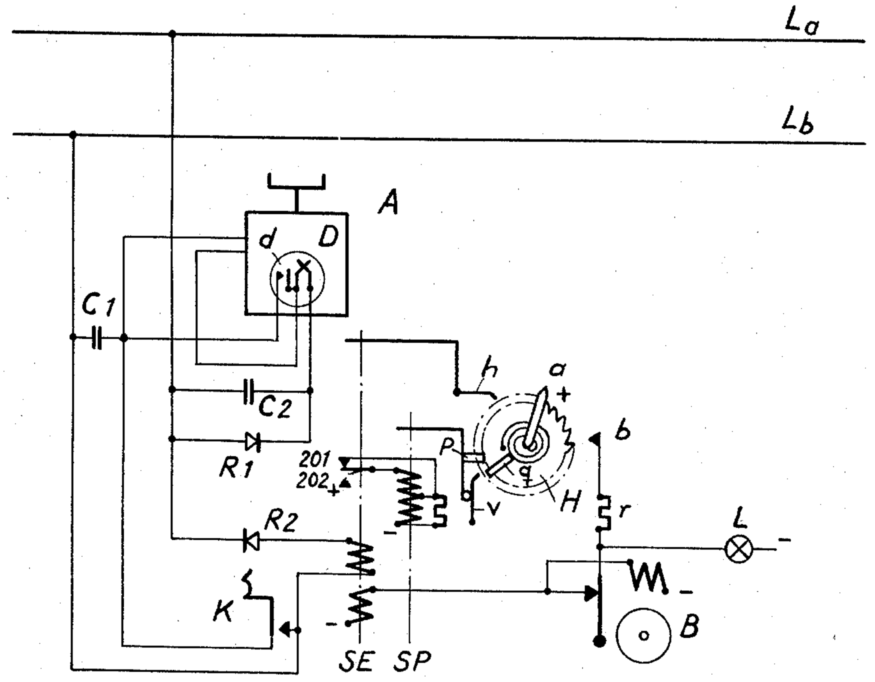

The present invention refers to a selector system for telephone lines with a number of telephone stations connected in parallel to the same line and comprising each a telephone instrument, a selector and a bell provided with means for time delay. Selector lines of the type related to here are usually provided with one line equipment only, which equipment is common to all the stations and is connected at one of the ends of the line. In order to increase the reliability of operation and render an internal traffic possible between at least part of the stations, even should there arise a rupture on the line, two or more line equipments may be connected to the same line, for example one at each end of the line. At a call from a station, said call is marked in all the line equipments, but only one line equipment is to receive and transmit impulses for setting the selectors and for the calling signal. To this end, the line equipments connected to the same selector line respond at different speeds to the calling signal and the quickest one emits a busy impulse, which disconnects the other equipments from the line.

The invention refers to a system for achieving this with simple means and is thus limited to selector lines with at least two line equipments connected to the line, each comprising a first relay device with relays as well for call marking as for impulse emission and relays for emission of a busy impulse, a first long impulse which actuates the bell at the called station, and a second long impulse for restoring the second line equipment after the end of the communication, the line equipments being furthermore provided with a second relay device comprising an impulse relay for receiving the busy impulse and other impulses from the second line equipment, a break-relay for cutting-off the first relay device, and a first auxiliary relay for operating the break-relay after the end of the busy impulse and releasing said break-relay at reception of a long impulse.

Special provisions must be made to prevent the first long impulse, emitted from one of the line equipments to actuate the bell of the called station, from causing release of the break-relay in the second line equipment. According to the invention this is achieved by means of a second auxiliary relay in said second relay device, which auxiliary relay attracts during the busy impulse in a circuit, which is closed by the first auxiliary relay and broken by a break-contact on the break-relay, said auxiliary relay thereafter attracting at the end of the first impulse in each pulse train in a circuit, which is closed by the first auxiliary relay and comprises a make-contact on the break-relay and a break-contact on the impulse relay, said second auxiliary relay on one hand breaking the circuit for operation of the first auxiliary relay, and on the other hand closing a circuit through its own winding over a make-contact on the impulse relay and being kept actuated by means of the last mentioned circuit until the end of the impulse train, owing to its being slow-releasing.

By means of the invention, a standardisation of the line equipments is obtained at the same time, since the line equipments can be manufactured as independent units which need not be connected to selectors for example for intertraffic with other selector lines, which selectors count the number of impulses sent on the selector line and participate in controlling the resulting operations.

The invention will be described more in detail in the following with reference to the accompanying drawings Figs. 1 and 2.

Fig. 1 shows a telephone station. Fig. 2 shows a line equipment.

In Fig. 1, *La*—*Lb* is a selector line, A a telephone instrument with dial D and push-button K, SE—SP is a selector with a stepping wheel H operated by a watch spring, and B is a bell. The selector is provided with a stepping magnet SE and a holding magnet SP. Both magnets have an angular armature. The armature of the stepping magnet supports a step-pawl *h*, and the armature of the holding magnet actuates a retaining pawl *v*. There are furthermore two contacts *a*—*b* and two hocks *p*—*q*. There are also two rectifiers R1 and R2, a filament lamp L, two condensers C1—C2 and a resistance *r*.

The subscriber tests whether the selector line is free by lifting his handset, whereby a test circuit is closed over the condensers C1 and C2. If the line is free, the push-button K is pressed down and the call is marked in the line equipment in Fig. 2. The current direction is thereby: + on wire L*a*, rectifier R1, dial D, instrument A, push-button K, to negative over wire L*b*. The subscriber thereafter dials a two-digit number on his dial. The contact *d* short-circuits the instrument A when the dial is dialled. For each interruption in the movement of the dial the current direction is switched from the line equipment during a short while, whereby the stepping magnet SE of the selector receives an impulse for each impulse of the dial. The current direction is now: + from wire L*b*, the upper winding on magnet SE, rectifier R2, to negative on wire L*a*. As is evident from the figure, this circuit is closed for all the selectors connected to the line. The contacts 201—202 are actuated and the stepping wheel H is moved one step for each impuse due to the angular armature of the stepping magnet actuating the stepping wheel H by means of the step-pawl *h*. The holding magnet SP is energized over contact 202 and attracts its armature, the retaining pawl *v* and the hock *p* thereby being actuated. The upper winding of the holding magnet is short-circuited after each impulse of the contact 201, which renders the holding magnet slow-releasing and causes it to hold its armature attracted during each impulse train. Upon the end of the first impulse train one of two situations may be present:

(*a*) When the first digit does not indicate the group of subscribers, to which the station belongs, the stepping wheel H of the selector returns to its initial position when holding magnet SE releases its armature and the retaining pawl *v* is drawn aside.

(*b*) When the first digit indicates the group of subscribers, to which the station belongs, the two hocks *p* and *q* mesh and prevent the armature of the holding magnet from releasing and the retaining pawl *v* remains meshed. The stepping wheel H remains in actuated position.

By means of other impulses the stepping wheel in one of the selectors is moved to the position before the position, in which the contacts *a* and *b* make contact with each other. Immediately after the second impulse train, before the holding magnet SP has released its armature, a long impulse is emitted from the line equipment in Fig. 2, which impulse moves the stepping wheels in all the selectors one further step forward and actuates the bell in the selector, the contacts *a* and *b* of which now come into contact with each other. Circuits are closed over the contacts *a* and *b* and the resistance *r*, on one hand over the filament lamp L, on the other hand through the magnet of the bell B, and finally through the lower winding on the stepping magnet SE. The filament lamp L has initially a low resistance and shunts the magnet of the bell so that it cannot be actuated. Thus, each time the stepping wheel H during an impulse train moves the contact *a* past the contact *b* the bell has no time to actuate. During a long impulse of 3–4 seconds the lamp L is however heated, and its resistance increases so that the bell starts ringing. The bell B is a D. C. bell with self breaking contact. Since the lower winding on stepping magnet SE is connected in parallel with the magnet of the bell, the current impulses are induced in the upper winding of stepping magnet SE, which allows the calling subscriber to hear that the calling signal is emitted. After the end of the long calling impulse, the magnets SE and SP release their armatures and the stepping wheel H is restored to initial position. The called subscriber answers by pressing down the push-button K.

Figure 2:
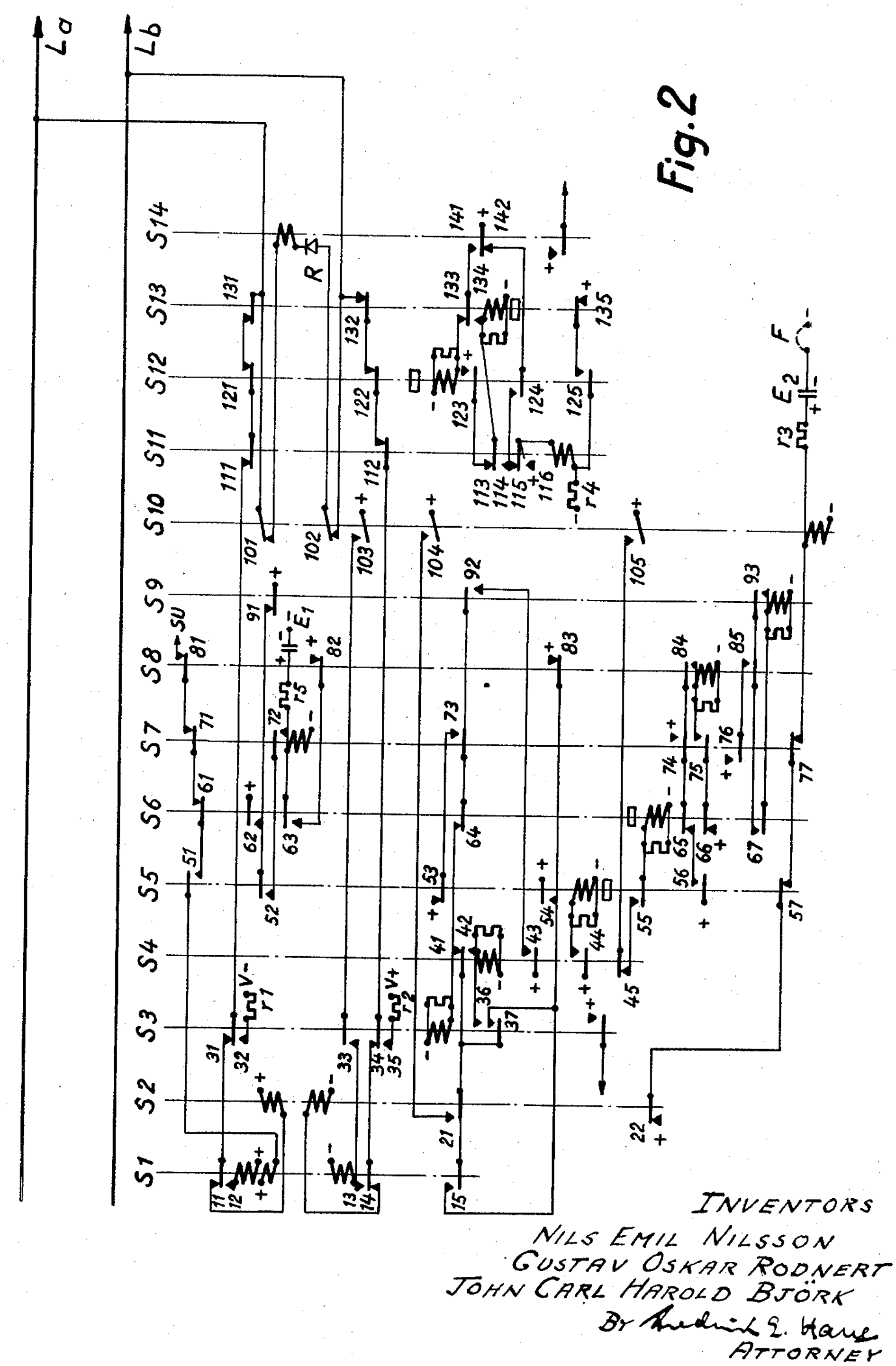

Fig. 2 shows a line equipment connected to the selector line L*a*—L*b*. The line equipment comprises two relay devices S1—S10 and S11—S14. The relay S10 is a steady current relay, which switches between the two relay devices, when its circuit is broken by any of the contacts 22, 57 or 77. The contacts 101—105 are actuated when the line equipment is in rest position.

At call from a telephone station according to Fig. 1 the following circuit is closed:

+, the upper winding on relay S2, the contacts 11, 31, 111, 121 and 131, wire L*a*, rectifier R1, dial D, instrument A, push-button K, wire L*b*, the contacts 132, 122, 112, 34 and 14, the lower winding on relay S2, to negative. Relay S2 attracts its armature. The contacts 21—22 are operated. The circuit for relay S10 is broken by contact 22. The winding on relay S10 is connected in parallel with an electrolytic condenser E2 and a protective resistance *r*3, by means of which the release time of relay S10 is determined. If there are several line equipments, the connection F is broken in the line equipment which is the first one to receive the call. Electrolytic condensers of different capacitance are connected in the other line equipments in such a manner, that the relays S10 have different release times, it being assumed that the connection F is broken so, that relay S10 is quick-releasing.

The contacts 101—102 break and 103—105 actuate. Relay S3 is energized over the contacts 104, 21 and 41. The contacts 31—37 are actuated. The selector magnet SE in Fig. 1 is energized in the following circuit: V+, resistance *r*2, the contacts 35, 112, 122, 132, wire L*b*, the upper winding on stepping magnet SE, rectifier R2, wire L*a*, the contacts 131, 121, 111 and 32, resistance *r*1, to V—. The references V+ and V— refer to the poles of an auxiliary battery with a voltage of about 100 volts. All the selectors connected to the selector line move their stepping wheel one step forward and are restored to normal after the end of the impulse. Simultaneously, relay S4 attracts in a circuit over the contacts 83 and 36, and relay S1 attracts in a circuit over the contacts 83, 37 and 41. The contacts 11—15 and 41—45 are actuated. Relay S5 attracts. The contacts 51—57 are operated. Relay S3 releases its armature with some delay due to a parallel resistance. Relay S4 is kept energized over the contacts 83 and 54, respectively, 15 and 42. Relay S1 is kept in the following circuit: +, the upper winding of relay S1, the contacts 12, 31, 111, 121, 131, wire L*a*, rectifier R1, dial D, the calling instrument A, push-button K, wire L*b*, the contacts 132, 122, 112, 34 and 13, the lower winding on relay S1, to negative.

The busy impulse emitted by relay S3 to the selectors is received by impulse relay S14 in the line equipments, the switch relay S10 of which is still actuated. Relay S14 and the selector magnets SE, are connected in series with a rectifier R, which blocks the current from the ordinary battery but allows passage of the current from the auxiliary battery V+, V—. The contacts 141—142 are actuated. Relay S12 attracts. The contacts 123—125 close. Relay S13 attracts. The contacts 133—135 are actuated. The relays S12 and S13 are slow-releasing and the impulse from relay S3 has a short duration, whereby relay S12, the current of which is broken by contact 133, has no time to release its armature before the end of the busy impulse and therefore break-relay S11 attracts when impulse relay S14 releases in a circuit over contacts 142, 124 and 115, winding on relay S11, resistance *r*4, to negative. The contacts 111—116 are actuated. Relay S11 is kept actuated over contact 116 and the relays S12 and S13 release. The relay device S1—S10 in the auxiliary line equipments is thus disconnected.

The calling subscriber now hears a buzzer tone emitted from a buzzer SU through the intermediate winding on relay S1 and transmitted over the contacts 51, 61, 71 and 81, and starts impulsing by means of his dial D. At the first break in dialling first relay S1 and thereafter relay S4 release. Relay S5 is very slow-releasing and is kept attracted during the impulse train emission. Relay S6 attracts with current over contacts 105, 45 and 55. The contacts 61—67 are actuated. Relay S7 attracts in a circuit over the contacts 82 and 63. The contacts 71—77 are operated. Relay S6 is quick-operating but slow-releasing and remains attracted until the end of the first impulse train. Relay S7 is kept actuated in a circuit over the contacts 91, 52 and 72. The electrolytic condenser E1 is loaded over resistance *r*5. After the end of the first dial impulse the relays S2, S3, S1 and S4 attract again, which causes an impulse from the battery V+, V— to be emitted to the selectors and relay S14 in other line equipments, as has been mentioned above. The selectors move their stepping wheels forward one step and the relays S14 and S12 attract. The holding magnet SP in the selectors attracts and keeps the retaining pawl *v* meshed with the stepping wheel H until the end of the impulse train.

Relay S12 in the second line equipment closes the contacts 123—124. The winding on break-relay S11 is short-circuited by contact 125, but the break-relay does not release during the time a dial impulse lasts. After the end of the first impulse the impulse relay S14 releases. Relay S13 attracts in a circuit over the contacts 142, 124 and 114. The contacts 133—135 are actuated. The shortcircuiting of relay S11 ceases and the slow-operating relay S13 closes contact 134, which causes the relay to be magnetized during each following impulse and to be actuated until the end of the impulse train. Relay S12 releases its armature after contact 133 has been operated.

After the end of the first impulse train relay S6 releases. Relay S8 attracts in a circuit over the contacts 66 and 75 and is thereafter kept energized in a circuit over the contacts 74 and 84.

At the beginning of the second impulse train relay S6 attracts again. Relay S9 now attracts in a circuit over the contacts 76, 85 and 67 and is kept energized over the contacts 76, 85 and 93, after the contacts 91—93 have been operated. The holding circuit for relay S7 is broken by contact 91, but a new holding circuit is closed over contact 62 until the end of the impulse train. After the end of the second impulse train relay S6 releases. The following circuit is closed: +, the contacts 43, 92 and 64, winding on relay S3, to negative. Relay S3 attracts and emits a long impulse from battery V+, V—, during which a calling signal is sent. The length of the long impulse is determined by the electrolytic condenser E1, which discharges itself through the winding on relay S7, relay S7 thereby being kept actuated 3–4 seconds. After the end of the calling signal relay S7 and the relays S3, S8 and S9 release.

The holding magnets SP in the selectors and relay S13 in the line equipments release slower than does relay S6 and therefore remain actuated during the calling signal. After the end of the calling signal they release and the stepping wheels in the selectors are restored to their initial positions simultaneously with the contacts 131—135 being released. A communication can thereafter be transmitted over the selector lines. During the call the relays S1 and S4 are attracted as they were immediately after the end of the busy impulse. When the calling subscriber puts down his handset and pulls up the push-button K, the relays S1 and S4 release. Relay S6 attracts. Relay S7 attracts and the electrolytic condenser E1 is loaded. Relay S5 releases its armature, whereupon relay S6 releases whereas relay S7 remains attracted during the charging time of the electrolytic condenser. Relay S3 attracts in the following circuit: +, the contacts 53, 73 and 64, winding on relay S3, to negative. A long impulse is emitted on the selector line, the relays S14 and S12 in the second line equipment therefore attracting. During the impulse the break-relay S11 is shunted by the contacts 135 and 125 and releases its armature. The selectors are moved one step forward but are restored to their initial positions after the end of the impulse.

A selector line is usually provided with a line equipment at each end, one of the line equipments thereby being a reserve. If both ends of the selector line are to be connected to other lines, the relays S3 and S4 are suitably provided with contacts for transmitting the impulses to the selecting devices, as is indicated in Fig. 2.

We claim:

A selector system for connecting several telephone stations to a common line, said system comprising, in combination, said telephone stations and at least two line equipments all connected in parallel to said common line at different points of the line, each telephone station including a telephone instrument having a dial, a selector and a time-delayed bell, each line equipment comprising a first and a second relay means, the first relay means including relays for call marking, sending of a busy pulse at a call and transforming trains of dial-pulses respectively, relays for sending a first long pulse at the end of a train of dial-pulses to operate said bell at a called station and for separately sending a second long pulse to restore all line equipments, and a relay (S10) to disconnect said second relay means prior to the sending of said busy pulse, said second relay means including a pulse relay for receiving pulses from another line equipment, said pulse relay having a break-contact, a break-relay to disconnect said first relay means, said break-relay having a make-contact, a first slow-releasing auxiliary relay (S12) having a make-contact and cooperating with said pulse relay to operate said break-relay at the end of a received busy pulse and to release the break-relay upon receiving said second, separately sent long pulse, and a second slow-releasing auxiliary relay (S13) connected in a circuit including the break-contact of said pulse relay, the make-contact of said first auxiliary relay and the make-contact of said break-relay at the end of the first pulse in each of said trains of dial-pulses and cooperating with the pulse relay to prevent the release of the break-relay upon receiving said first long pulse.

References Cited in the file of this patent

UNITED STATES PATENTS

| | | |
|---|---|---|
| 1,568,038 | Williams | Dec. 29, 1925 |
| 2,023,239 | Ostline | Dec. 3, 1935 |